United States Patent
Mathison

(10) Patent No.: US 10,278,110 B2
(45) Date of Patent: Apr. 30, 2019

(54) SIMPLIFIED CARRIER MIGRATION USING ALIAS ACCESS POINT IDENTIFICATION

(71) Applicant: Verizon Patent and Licensing Inc., Arlington, VA (US)

(72) Inventor: James Mathison, Warren, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 56 days.

(21) Appl. No.: 15/695,360

(22) Filed: Sep. 5, 2017

(65) Prior Publication Data
US 2019/0075505 A1    Mar. 7, 2019

(51) Int. Cl.
*H04W 8/18* (2009.01)
*H04W 36/12* (2009.01)
*H04W 36/38* (2009.01)

(52) U.S. Cl.
CPC ......... *H04W 36/385* (2013.01); *H04W 8/18* (2013.01); *H04W 36/12* (2013.01); *H04Q 2213/201* (2013.01)

(58) Field of Classification Search
CPC ..... H04W 36/385; H04W 36/12; H04W 8/18; H04W 8/183; H04W 8/205; H04W 12/04; H04W 12/06; H04W 12/08; H04Q 2213/201; H04Q 2213/215; Y02D 70/1262; Y02D 70/142; Y02D 70/144; Y02D 70/146
See application file for complete search history.

(56) References Cited

U.S. PATENT DOCUMENTS

| | | | | |
|---|---|---|---|---|
| 7,411,922 B1* | 8/2008 | Savunen | ............... | H04W 76/12 370/328 |
| 8,472,425 B2* | 6/2013 | Venkatachalam | ..... | H04W 80/04 370/343 |
| 2009/0310485 A1* | 12/2009 | Averi | ...................... | H04L 45/00 370/232 |
| 2014/0173331 A1* | 6/2014 | Martin | ................ | G06F 11/2002 714/4.11 |
| 2015/0078288 A1* | 3/2015 | Sanyal | .................... | H04W 8/02 370/329 |
| 2016/0057592 A1* | 2/2016 | Tagg | ................... | H04W 84/042 455/414.1 |
| 2016/0234681 A1* | 8/2016 | Swissa | .................... | H04W 4/70 |
| 2017/0054639 A1* | 2/2017 | Zhou | ..................... | H04W 92/02 |
| 2017/0318440 A1* | 11/2017 | Brown | .................. | H04W 88/14 |

FOREIGN PATENT DOCUMENTS

WO    WO-2014069927 A1 *    5/2014    ........ H04W 36/0033

* cited by examiner

*Primary Examiner* — Afsar M Qureshi

(57) ABSTRACT

A mobility management node, in a first wireless carrier network, receives a connection request that includes a first Access Point Name (APN) that is invalid in the first wireless carrier network, wherein the connection request originated from a wireless device. The mobility management node obtains a set of first APNs that map the first APN, and other APNs, that are invalid in the first wireless carrier network, and translates the first APN to a second APN corresponding to the first wireless carrier network using the set of first APNs. The mobility management node uses the second APN in signaling associated with a connection, between the wireless device and the first wireless carrier network.

20 Claims, 13 Drawing Sheets

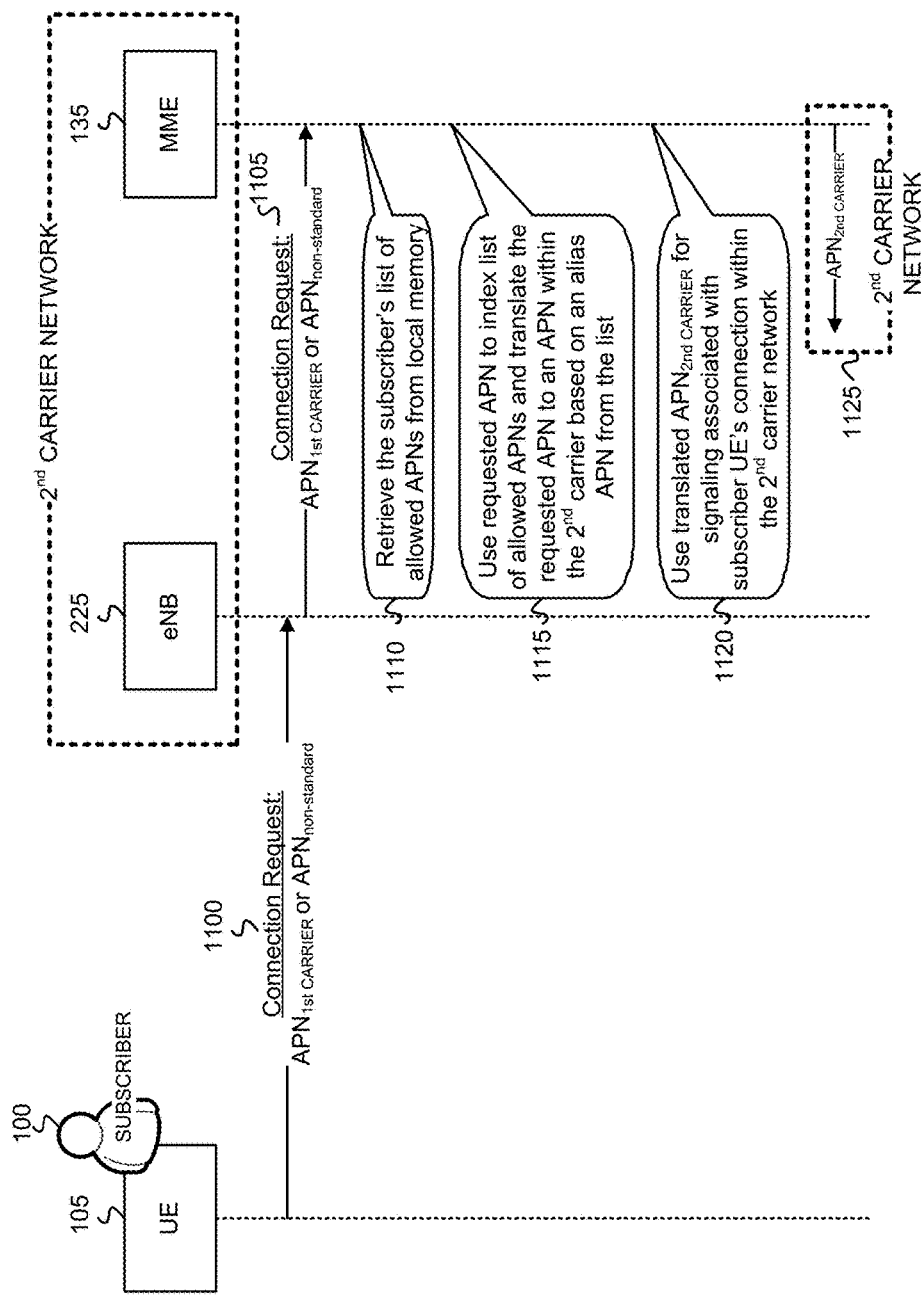

SIMPLIFIED CARRIER MIGRATION USING ALIAS ACCESS POINT IDENTIFICATION

BACKGROUND

Users of wireless devices, communicating within wireless networks such as Public Land Mobile Networks (PLMNs), often attempt to connect to a network that is connected to the wireless network. For example, the user of a wireless device may attempt to use a web browsing application at the wireless device to connect to the Internet via a PLMN. In such wireless networks, Access Point Names (APNs) may be used for identifying another network (e.g., the Internet, an Internet Protocol Multimedia Subsystem (IMS) network), and/or a particular gateway associated with the other network, that a wireless device user wants to communicate with, and, additionally, may be used for defining a type of service to be provided via the other network.

When the wireless network receives a connection request that includes a particular APN, the wireless network examines the APN to determine what type of network connection should be created, and to which other network the requesting wireless device should be connected. The wireless network uses the APN to set up a connection between the requesting wireless device, and a gateway between the wireless network and the other network. As one particular example, the APN may identify the Internet as the other network being requested (e.g., APN="internet"). An APN typically includes an identifier that identifies the other network to which a connection is being requested, and may optionally identify the particular service requested by the device user. Each wireless carrier network may maintain its own specific set of APNs that may only be valid within that carrier's wireless network. Therefore, APNs that are valid for use within a first wireless carrier network may be invalid for use within a second wireless carrier network (and vice versa).

BRIEF DESCRIPTION OF THE DRAWINGS

FIG. 11 is an exemplary operations/messaging diagram associated with the exemplary process of FIG. 10.

DETAILED DESCRIPTION OF THE PREFERRED EMBODIMENTS

Figure 1:
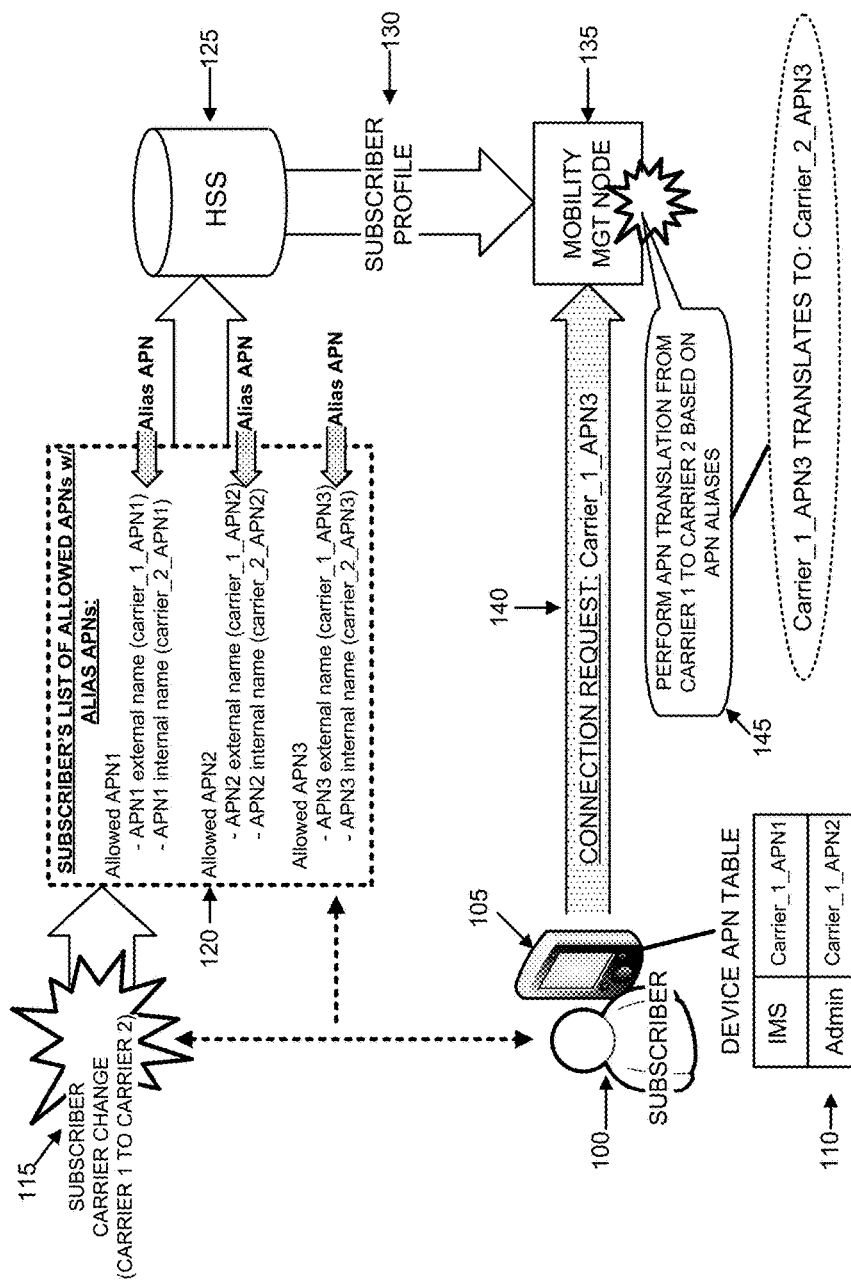
FIG. 1 illustrates an exemplary overview of the use of alias APNs for translating APNs associated with a first wireless carrier network, or non-standard APNs, to respective APNs associated with a second wireless carrier network.

The following detailed description refers to the accompanying drawings. The same reference numbers in different drawings may identify the same or similar elements. The following detailed description does not limit the invention, which is defined by the claims.

The mobile network industry has been attempting to address the demand for greater inter-carrier migration capability by developing new embedded Universal Integrated Circuit Cards (eUICCs) that enable a customer or carrier to electronically modify the profile (e.g., Subscriber Identity Module (SIM) profile) of the customer when moving a wireless device from one wireless carrier to another wireless carrier. For instance, if a second carrier (e.g., Verizon) were to win a large group of customers from a first carrier (e.g., AT&T), each of the customer's eUICCs can be electronically modified (e.g., via over-the-air programming) to remove the first carrier's credentials from each customer's profile and add new credentials for the second carrier such that the customers would be able to move their devices over to the second carrier without having to physically swap out their devices, or the SIMs in their devices. While this ability is a significant step, it does not completely address the problems associated with the move of a device from one carrier to another. The eUICC provides the authentication service, and also includes the information that will guide the device to select the correct radio frequency (RF) signal from all of the available choices. However, the wireless device itself controls actual Access Point Names (APNs) that the device will request when it connects to the second carrier's wireless network. Since these APNs are not standardized among wireless network carriers, the need to change the APNs on the wireless device causes additional problems with the inter-carrier migration process.

When a customer/subscriber changes from a first carrier to a second carrier, an update of the eUICC of the customer's wireless device can be performed automatically to update the SIM contents, but there is no simple way to update the APN names to change the first carrier APNs to the second carrier APNs. Even if over-the-air device management attempts to update the device APN table, there is no guarantee that this will work because the first carrier's device management client may not be compatible with the second carrier's device management server. Even if the device management client is compatible with the second carrier's device management server, the wireless device will not be able to access the second carrier's wireless network until the APN table is updated, and the second carrier's over-the-air device management server will not have any way to reach the device until it can connect to the second carrier's wireless network. This "catch-22" situation requires that the customer swap out their devices, or else manually update the device APN table on each device as part of the migration from the first carrier to the second carrier.

A related, but distinct problem, with carrier-specific APN names is that some wireless customers split their business across multiple carriers for various reasons, such as, price competition, global coverage, etc. These customers would prefer to be able to standardize on one set of APN names so that they can program their devices at the factory and then activate them on one of multiple carriers without the need to reprogram the APN names on their device. Today, this is not possible since each carrier uses different, carrier-specific, non-standardized APNs. These customers, thus, may wish to maintain the flexibility to use multiple different carriers, or to change to a different carrier in the future.

Yet another problem involving APNs is that some device manufacturers may be unwilling to delivery carrier-specific versions of devices that are pre-loaded with carrier-specific APNs. Additionally, some device manufacturers may be unwilling to deploy versions of devices with a carrier-compatible device management client. Historically, some carriers (e.g., Verizon™) have been able to convince manufacturers to comply with those carriers' device requirements. But as new low-cost devices come onto the market (e.g., LTE CatM1 devices, LTE NB-IoT devices, etc.), the cost of producing and stocking carrier-specific models of devices may be unsupportable due to the low cost and low profit margin nature of the devices. Therefore, new low-cost devices coming onto the market may not be pre-loaded with carrier-specific APNs or a carrier-compatible device management client. If these new devices are not pre-loaded with carrier-specific APNs, they will not be able to connect to a specific carrier's network until the APNs have been updated on the devices. If these new devices are not pre-loaded with a carrier-compatible device management client, they may not be capable of being managed by a specific carrier such that carrier-specific APNs can be automatically updated on the devices, and updated APNs for the specific carrier may need to be manually loaded into the device.

A further problem involving APNs occurs with out-of-box (OOB) devices that have default APN tables that do not match the APN table required in the particular wireless carrier network to which the devices are attempting to connect. For example, in Verizon's™ wireless carrier network, a default class 3 APN for connecting to the Internet is "vzwinternet." However, Verizon™ Mobile Private Network (MPN) service customers need to use a customer-specific, non-standard APN of the form <company>.vzwentp. Devices of these MPN service customers often do not receive correct Internet access service until after the device APN table is updated, which can take an undesirable period of time.

A possible solution to the issue of carrier-specific APNs during carrier migration would be to allow devices to continue to use their old APN names and configure the second carrier's wireless network to accommodate them. This solution is not usually feasible as the APN is a configured parameter in many network and Information Technology (IT) systems. For example, the APN is typically configured on the Packet Gateway along with a number of APN-specific parameters, so each customer-specific APN would need to be configured on every one of the second carrier's packet gateways. Also, the APNs are referenced in the rules of the Policy and Charging Rules Function (PCRF) in each carrier's wireless network, so new policy rules would be required for each customer-specific APN. Finally, the APN is considered when processing charging records, so the changes to the charging record processing would be required for each customer-specific APN. Therefore, it is not possible for a second carrier to accept non-standard APNs. As a result, the only option currently available is to update the device APNs at the customer's wireless device to conform to the second carrier's standards when the wireless device is ported to the second carrier's wireless network.

Exemplary embodiments described herein resolve the APN carrier migration problem, and other APN problems, discussed above with an extension of current wireless standards. With existing standards, the mobility management node in the wireless network (e.g., the Mobility Management Entity (MME)) receives a list of allowed APNs for each subscriber from the Home Subscriber Server. Embodiments described herein propose to include, within the list of allowed APNs for each subscriber, two different APNs for each destination: an external APN that the wireless device requests when requesting a connection, and an internal APN that the wireless network will use for internal signaling. The external APN corresponds to the APN of the first network, or a non-standard APN, and the internal APN corresponds to the APN of the second network. This internal APN is also referred to herein as an "alias APN." Embodiments described herein, therefore, enable the translation of a first APN, contained in a service request (e.g., a connection request) and that is invalid within the particular wireless carrier network to which the wireless device is connecting, to a second APN that is valid within the particular wireless carrier network via the use of alias APNs. Therefore, as described herein, given APNs programmed into the device APN tables of wireless devices may, when necessary, be translated into appropriate APNs that are valid within a particular wireless carrier network in a manner that is transparent to the wireless devices and their customers, without necessitating reprogramming or updating of the device APN tables at the wireless devices.

FIG. 1 illustrates an exemplary overview of the use of alias APNs for translating APNs associated with a first wireless carrier network, or non-standard APNs, to respective APNs associated with a second wireless carrier network. As shown, a subscriber 100, who owns, and/or operates a wireless device, referred to herein as a user equipment (UE) 105, has subscribed to wireless service from a first wireless carrier network (Carrier 1) such that subscriber 100 may use UE 105 to communicate via the first wireless carrier network. A "wireless carrier network," as referred to herein, may include a wireless network, such as a PLMN or satellite network, that is owned, operated, and/or administered by a particular wireless network provider. A "first wireless carrier network" and a "second wireless carrier network," therefore, refer to two different wireless networks that are owned, operated and/or administered by two different wireless network providers. As further shown in FIG. 1, the subscriber 100 chooses to change 115 wireless carrier networks from the first wireless carrier network (1st Carrier) to a 2nd wireless carrier network (2nd Carrier). Alternatively, the subscriber 100 may maintain subscriptions with two or more wireless carrier networks simultaneously, with each carrier network having its own carrier-specific APNs, and the subscriber 100 may elect to switch from use of the first wireless carrier network to the second wireless carrier network. As a further alternative, the subscriber 100's UE 105 may not have a carrier-specific device management client and/or may have non-standard APNs, that are invalid in the second wireless carrier network, programmed into the UE 105's device APN table 110.

Upon the subscriber 100 initiating the changing of wireless carrier networks, alias APNs are determined, that correspond to APNs associated with the second wireless carrier network, and are inserted into the subscriber's list 120 of allowed APNs. The alias APNs, inserted into list 120, are also identified as "internal name" APNs and are associated, in list 120, with a corresponding "external name" APN within the first wireless carrier network. The subscriber's list 120 of allowed APNs may then be inserted within a subscriber profile within a Home Subscriber Server (HSS) 125, or similar database, within the second wireless carrier network. The subscriber profile 130 may be subsequently retrieved from HSS 125 and sent to a mobility management node 135 that handles connection requests, and other signaling, from the UE 105 of the subscriber 100.

As shown in the example of FIG. 1, the subscriber 100, using UE 105, attempts to connect to the Internet, and UE 105 retrieves, from device APN table 110, the "Carrier_1_APN3" within table 110 that corresponds to the Internet. Alternatively, the device APN table 110 of UE 105 may store a non-standard APN, for the other network, that is invalid in the second wireless carrier network. UE 105 then sends a connection request 140 to mobility management node 135 that requests a connection to the other network (i.e., the Internet in this example) that is associated with the APN Carrier_1_APN3 or the non-standard APN (not shown). Upon receipt of connection request 140, mobility management node 135 uses the subscriber's list 120 of allowed APNs, and the internal and external APN contained within the list 120, to perform 145 an APN translation from the first wireless network carrier (Carrier 1), or non-standard APN, to the second wireless network carrier (Carrier 2). As depicted in FIG. 1, mobility management node 135 translates the APN from connection request 140 from "Carrier_1_APN3" to "Carrier_2_APN_3". Mobility management node 135 then connects UE 105 with a packet gateway (not shown) that further connects to the other network (i.e., the Internet in this example).

Figure 2A:
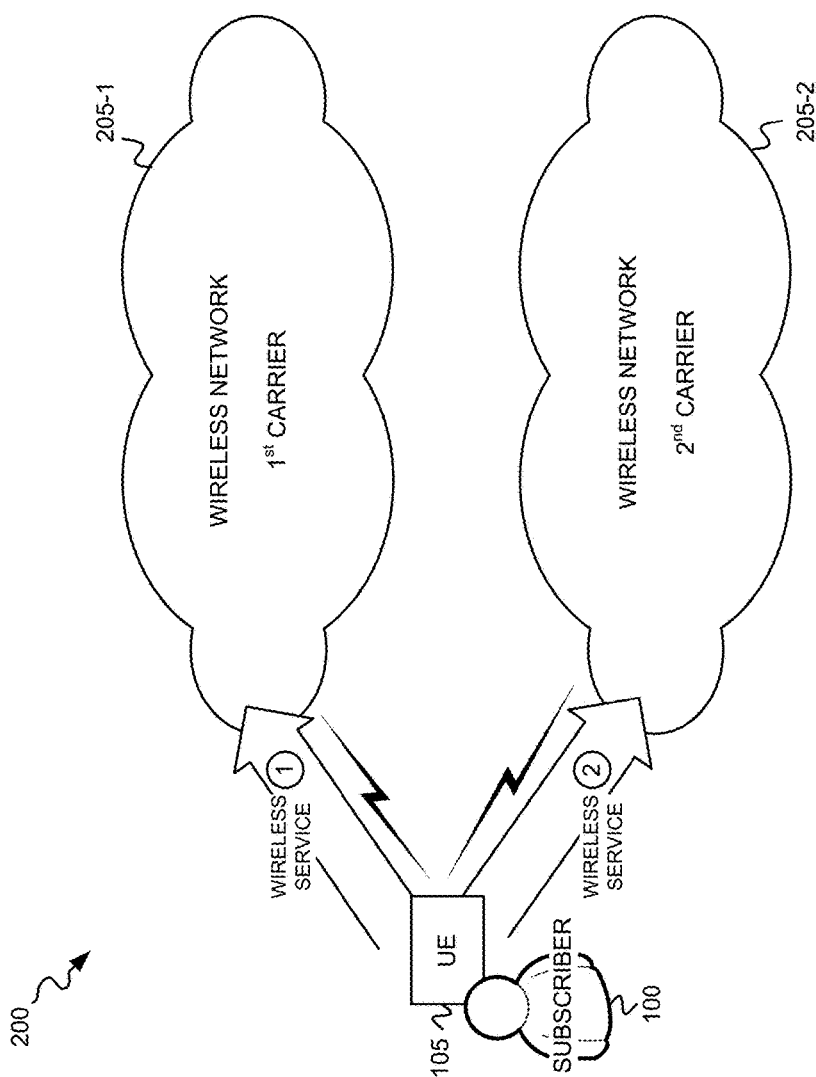
FIGS. 2A-2C depict an exemplary network environment in which alias APNs are used for translating APNs associated with a first wireless carrier network, or non-standard APNs that are invalid in a second wireless carrier network, to APNs associated with the second wireless carrier network when network signaling occurs between wireless devices and the second wireless carrier network.

FIG. 2A depicts an exemplary network environment 200 in which a set of alias APNs, or a set of first APNs, are used for translating APNs associated with a first wireless carrier network to APNs associated with a second wireless carrier network when network signaling occurs between UEs 105 and the second wireless carrier network. As shown, a UE 105 of a subscriber 100 (designated with a "1" within a circle) initially obtains wireless service via a first wireless network carrier 205-1. Subsequently, the UE 105 of the subscriber 100 obtains wireless service (designated with a "2" within a circle) via a second wireless network carrier 205-2. Subscriber 100 may, in one implementation, initially subscribe to the wireless service of the first wireless network carrier 205-1, and then change the subscription to the wireless service of the second wireless network carrier 205-2.

In another implementation, subscriber 100 may maintain service with two different wireless network carriers simultaneously, such as simultaneous subscriptions to wireless service via both of the first wireless network carrier 205-1 and the second wireless network carrier 205-2. In this implementation, UE 105 of subscriber 100 may switch back and forth between wireless services offered by each of the wireless network carriers.

Figure 2B:
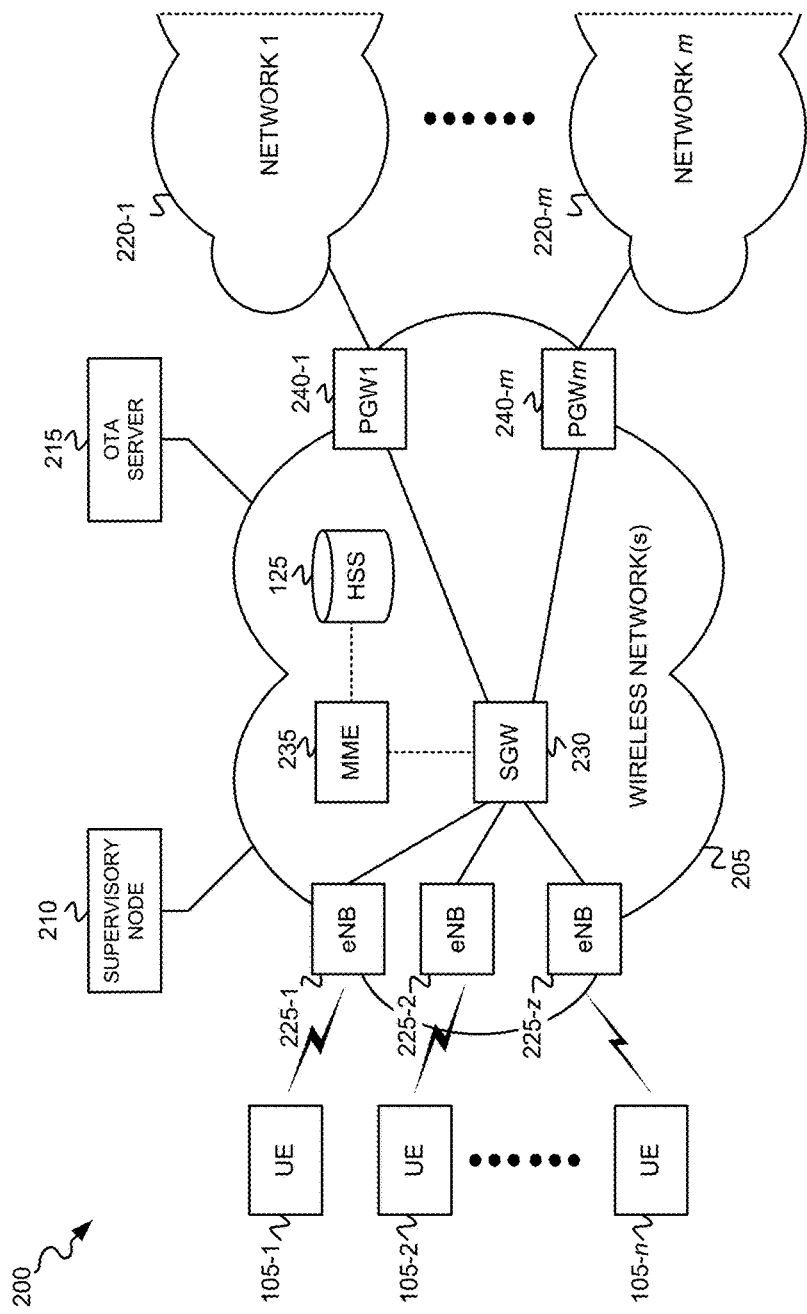

FIG. 2B depicts further details of the exemplary network environment 200 of FIG. 2A, including details of one example of wireless network 205. As shown, network environment 200 may include multiple UEs 105-1 through 105-n, a wireless network(s) 205, a supervisory node 210, an Over-the-Air (OTA) server 215, and multiple additional other networks 220-1 through 220-m that connect to wireless network 205.

UEs 105-1 through 105-n (referred to herein as "UE 105" or "UEs 105") may each include any type of electronic device that includes a wireless communication interface for communicating with wireless network 205 via a wireless connection. UEs 105 may each include, for example, a cellular telephone; a "smart" phone; a personal digital assistant (PDA); a wearable computer; a desktop, laptop, palmtop or tablet computer; a media player; a Machine-to-Machine (M2M) device, or an "Internet of Things" (IoT) device. A subscriber 100 (not shown in FIG. 2B) may be associated with each UE 105, where subscriber 100 may be an owner, operator, and/or a permanent or temporary user of a UE 105.

Wireless network(s) 205 includes one or more wireless networks. The one or more wireless networks may each include, for example, a wireless PLMN or a wireless satellite network that is operated and/or administered by a particular wireless network service provider (a "carrier"). The PLMN may include a Code Division Multiple Access (CDMA) 2000 PLMN, a GSM PLMN, a Long Term Evolution (LTE) PLMN and/or other types of PLMNs not specifically described herein. FIG. 2B depicts a single wireless network 205, however, network environment 200 may include two (or more) wireless networks, such as wireless networks 205-1 and 205-1 shown in FIG. 2B.

FIG. 2B further depicts components of one example of wireless network 205. As shown, wireless network 205 may include evolved NodeBs (eNBs) 225-1 through 225-z (generically referred to herein as "eNBs 225" or "eNB 225"), a serving gateway (SGW) 230, a Mobility Management Entity (MME) 235, HSS 125, and packet data network gateways (PGWs) 240-1 through 240-m. MME 235 corresponds to the Mobility Management node 135 depicted in FIG. 1.

eNBs 225 (also referred to herein as "base stations") each include hardware that wirelessly communicates directly with wireless devices (e.g., UEs 105) to enable network service with wireless network 205 (e.g., a PLMN). Each of eNBs 225 includes a wireless transceiver for communicating with the wireless devices, and a wired or wireless link for connecting to other nodes of wireless network 205 such as, for example, wired links to SGW 230 or MME 235.

SGW 230 includes one or more network devices that route and forward data packets received from UEs 105 and destined for destination nodes in network 205, or in networks 220-1 through 220-m; and also route and forward data packets received from PGWs 240 and destined for one or more UEs 105.

MME 235 includes one or more network devices that perform, within wireless network 205, mobility management functions, call control management functions, session management functions, and/or identity management functions associated with providing wireless service to UEs 105.

HSS 125 includes one or more network devices that store a database that contains subscriber-related and subscription-related information. HSS 125 may store subscriber profiles that further include subscriber lists of allowed APNs. HSS 125 may perform, based on the information stored in the database, a user authentication function, a session establishment function, and/or an access authorization function.

PGWs 240 each includes one or more network devices that provide connectivity from the UEs 105 to other networks connected to wireless network 205, such as networks 220-1 through 220-$m$. Each of PGWs 240 may be associated with a different APN that is used to connect a UE 105 to the PGW 240, and then on to a network 220.

Supervisory node 210 includes one or more network devices that keep track of wireless network subscriptions that each subscriber 100 maintains, and inserts alias APNs into the subscriber's list of allowed APNs based on, for example, a subscriber 100's change in wireless network service subscriptions from a first carrier to a second carrier, based on a subscriber 100's switching between carriers when subscriber 100 maintains simultaneous subscriptions with two or more carriers, and/or based on other circumstances described herein.

OTA server 215 includes one or more network devices that communicate with UEs 105 to remotely change or update data, settings, apps, functions, and/or services at UEs 105. In one implementation, OTA server 215 may update the APNs, associated with networks 220, stored in UE 105's device APN table 110 such as, for example, when the UE 105's subscriber changes wireless network carriers, and then connects to the new wireless network.

Networks 220-1 through 220-$m$ (referred to herein as "network 220" or "networks 220") may each include a separate network that connects to wireless network(s) 205 via a respective PGW 240. In one implementation, UEs 105 may communicate with a destination in a network 220, via a respective PGW 240, using an Access Point Name (APN) that is associated with that network 220. Each of networks 220 may include a network of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, an Internet Protocol (IP) Multimedia Subsystem (IMS) network, or a cable network (e.g., an optical cable network).

Figure 2C:
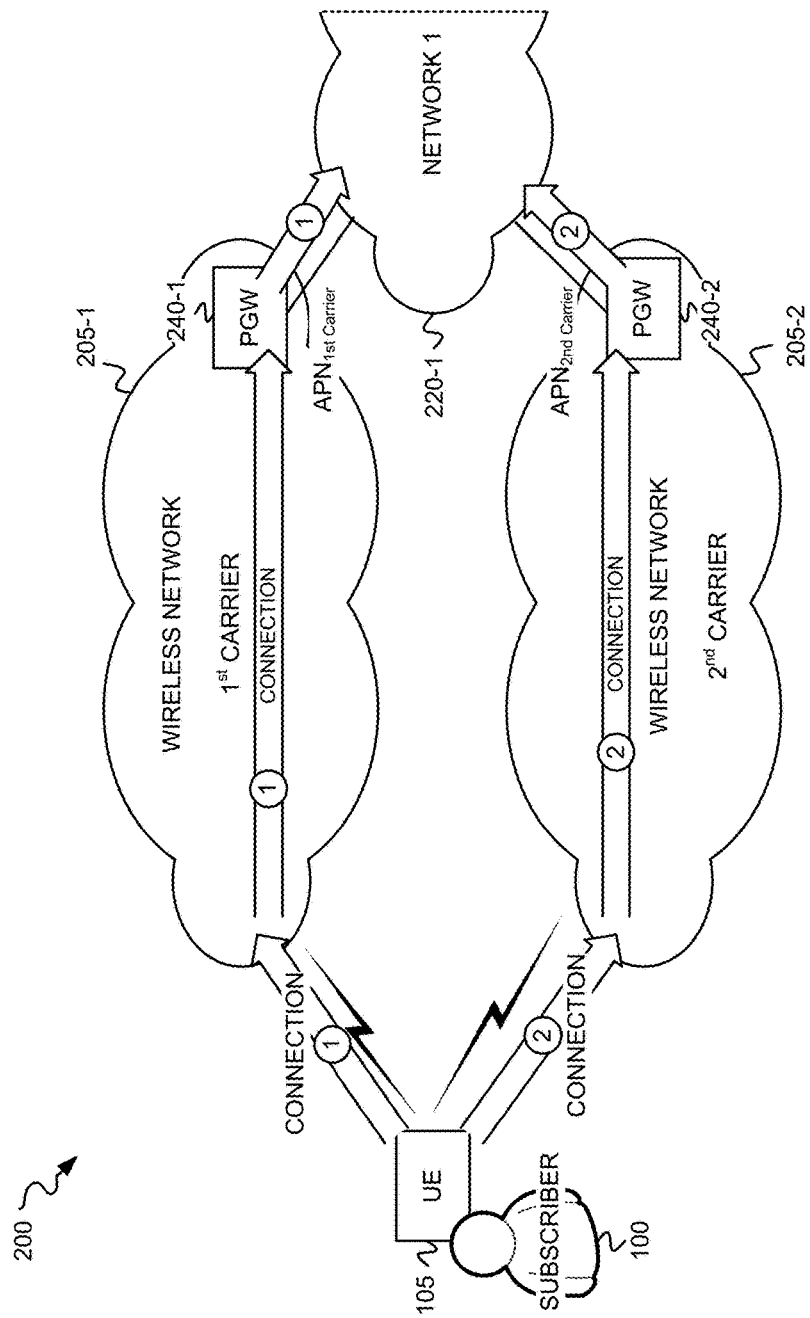

FIG. 2C depicts connections, from a UE 105 through two different wireless network carriers, to a same destination network. As shown, a UE 105 establishes a first connection (shown with a "1" within a circle), via a first packet gateway (PGW) 240-1 within a first wireless carrier network 205-1, to network 220-1. A first APN ($APN_{1st\ Carrier}$) is used, as valid within the first wireless carrier network 205-1, to establish the first connection from UE 105 to PGW 240-1 and network 220-1. As further shown, UE 105 subsequently establishes a second connection (shown with a "2" within a circle), via a second packet gateway (PGW) 240-2 within a second wireless carrier network 205-2, to network 220-1. A second APN ($APN_{2nd\ Carrier}$) is used, as valid within the second wireless carrier network 205-2, to establish the second connection from UE 105 to PGW 240-2 and network 220-1.

As described in further detail below, when UE 105 first attempts to establish the connection via the second wireless carrier network 205-2 after having previously established the connection via the first wireless carrier network 205-1, UE 105 retrieves $APN_{1st\ Carrier}$ from the device APN table 110 stored at UE 105, and, using the retrieved $APN_{1st\ Carrier}$, requests the connection via the second wireless carrier network 205-2, where the retrieved $APN_{1st\ Carrier}$ is invalid within the second wireless carrier network 205-2. A mobility management node (not shown in FIG. 2C) performs a translation of $APN_{1st\ Carrier}$ to the appropriate APN (i.e., $APN_{2nd\ Carrier}$) in the second wireless carrier network 205-2 such that a connection can be established between UE 105, PGW 240-2, and network 220-1. In one implementation, the mobility management node may perform the translation using a set of alias APNs or a set of first APNs stored in, for example, a subscriber profile for the subscriber 100 that owns, operates, and/or carries UE 105.

The configuration of the components of network environment 200 depicted in FIGS. 2A-2C is for illustrative purposes only, and other configurations may be implemented. Therefore, network environment 200 may include additional, fewer and/or different components, that may be configured differently, than depicted in FIGS. 2A-2C.

Figure 3:
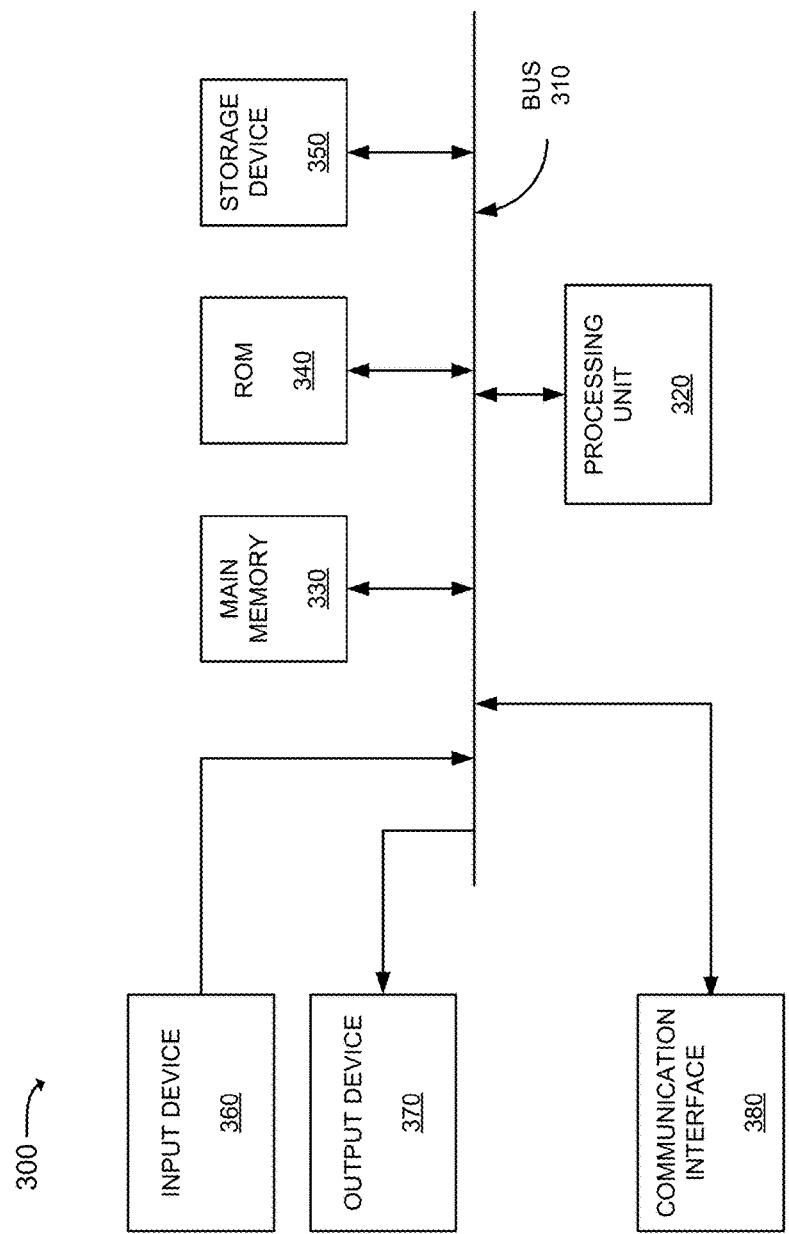
FIG. 3 is a diagram that depicts exemplary components of a device that may correspond to the user equipments, base stations, serving gateways, mobility management nodes, home subscriber server, supervisory node, over-the-air server, and packet gateways shown in FIGS. 2A-2C.

FIG. 3 is a diagram that depicts exemplary components of a device 300. UEs 105, eNBs 225, SGW 230, MME 135, HSS 125, supervisory node 210, OTA server 215, and PGWs 240 may each include a device or devices similar to device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may be a "tangible and/or non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 360 and output device 370 may be implemented as a graphical user interface (GUI) (e.g., a touch screen GUI that uses any type of touch screen device) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via network(s) 205 and/or 220. In the case of device 300 being an IoT device, communication interface(s) 380 may include only a wireless transceiver(s), such as, for example, a transceiver for communicating with an eNB 225 of wireless network 205.

The configuration of components of device 300 shown in FIG. 3 is for illustrative purposes. Other configurations may be implemented. Therefore, device 300 may include additional, fewer and/or different components, arranged in a different configuration, than depicted in FIG. 3. For example, an IoT device may include similar components to those shown in FIG. 3, but may omit input device(s) 360, output device(s) 370, and storage device 350.

Figure 4:
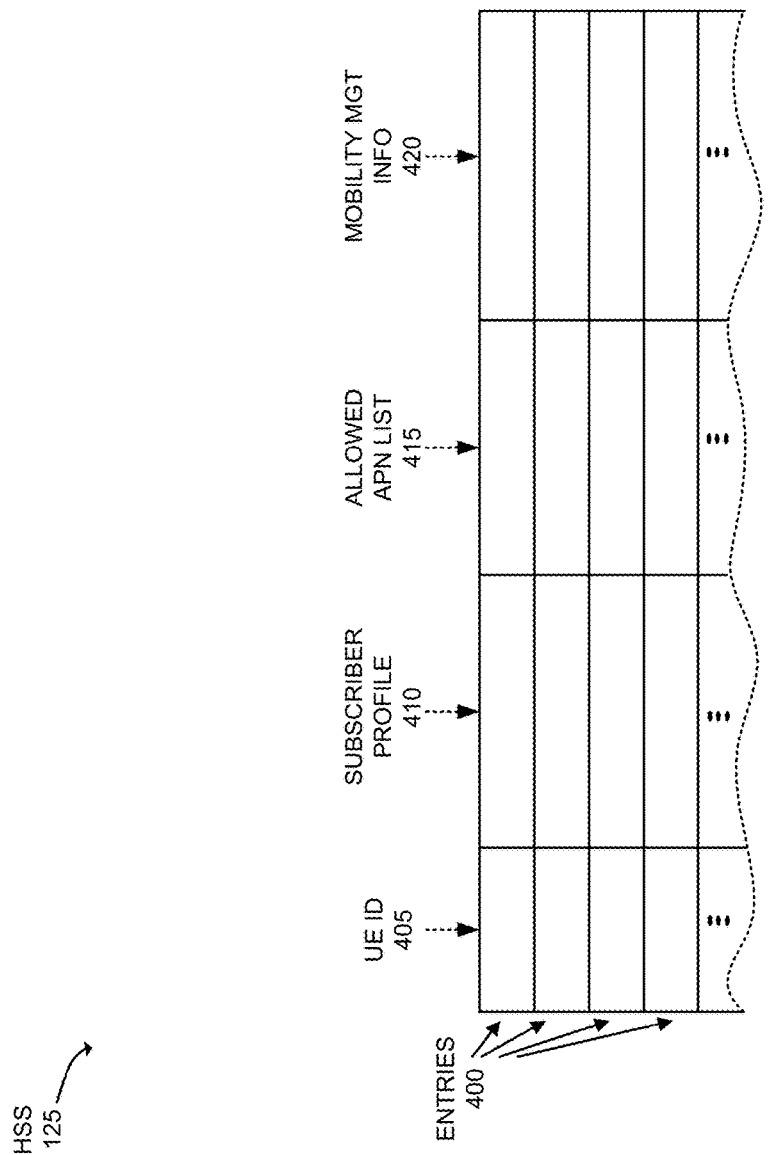
FIG. 4 is a diagram that depicts an exemplary implementation of a data structure stored in the home subscriber server of FIGS. 1 and 2B.

FIG. 4 is a diagram that depicts an exemplary implementation of HSS 125. As shown, a data structure of HSS 125 may include multiple entries 400, with each entry 400 including a UE identifier (ID) field 405, a subscriber profile field 410, an allowed APN list field 415, and a mobility management information field 420. The data structure of HSS 125 may be stored within a memory of a network device 300.

UE identifier (ID) field 405 stores a unique identifier (e.g., a globally unique ID (GUID)) for a respective UE 105. In one implementation, the UE ID may include an International Mobile Subscriber Identity (IMSI). Other types of UE IDs, however, may be used. Subscriber profile field 410 stores a profile associated with a particular subscriber 100 that owns, operates, and/or uses the UE 105 identified in field 405. Allowed APN list field 415 stores a list of allowed APNs that is associated with the particular subscriber 100 that owns, operates, and/or uses the UE 105 identified in field 405. Mobility management information field 420 stores mobility management data associated with the UE 105 identified in field 405.

HSS 125 is depicted in FIG. 4 as including a tabular data structure with a certain number of fields having certain content. The tabular data structure of HSS shown in FIG. 4, however, is for illustrative purposes. Other types of data structures may alternatively be used. The number, types, and content of the entries and/or fields in the data structure of HSS 125 illustrated in FIG. 4 is also for illustrative purposes. Other data structures having different numbers of, types of and/or content of, the entries and/or the fields may be implemented. Therefore, HSS 125 may include additional, fewer and/or different entries and/or fields than those depicted in FIG. 4.

To locate a particular entry at HSS 125, HSS 125 may be queried with, for example, a UE ID to locate an entry 400 having a matching UE ID stored in UE ID field 405. When such an entry 400 is located, data may be stored in one or more fields 405, 410, 415 and/or 420, or data may be retrieved from one or more fields 405, 410, 415 and/or 420. Other fields of an entry 400, instead of UE ID 405, may alternatively be used for querying HSS 125.

Figure 5:
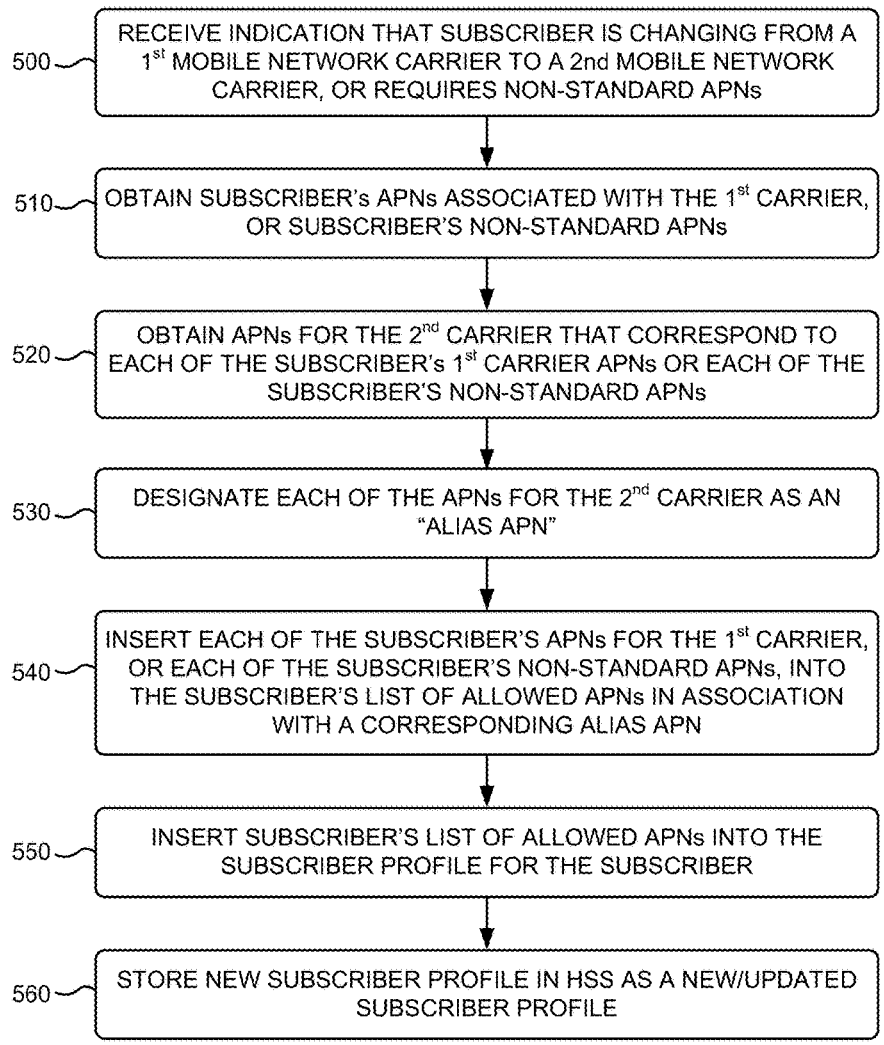
FIG. 5 is a flow diagram that illustrates an exemplary process for updating a subscriber's wireless network subscriber profile when the subscriber changes wireless service from a first wireless network carrier to a second wireless network carrier, or when the subscriber's wireless device uses non-standard APNs that are invalid in the second wireless carrier network.

FIG. 5 is a flow diagram that illustrates an exemplary process for updating a subscriber's wireless network subscriber profile when the subscriber changes wireless service from a first wireless network carrier to a second wireless network carrier, or when the subscriber's wireless device uses non-standard APNs that are invalid in the second wireless carrier network. In one implementation, the exemplary process of FIG. 5 may be implemented by supervisory node 210. The exemplary process of FIG. 5 is described below with reference to the diagrams of FIGS. 6 and 7.

Figure 7:
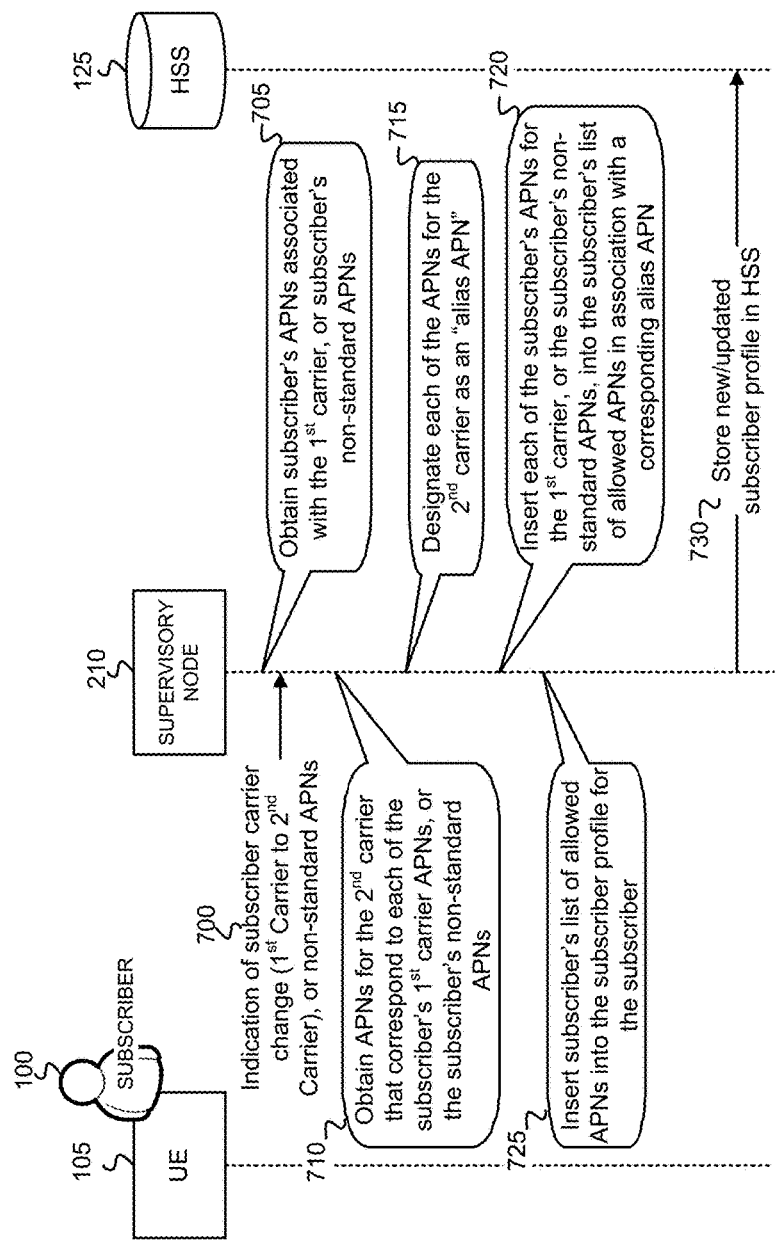
FIG. 7 is an exemplary operations/messaging diagram associated with the exemplary process of FIG. 5.

The exemplary process includes supervisory node 210 receiving an indication that subscriber 100 is changing from a first mobile network carrier to a second mobile network carrier, or that the subscriber 100's UE 105 requires non-standard APNs (block 500). In one circumstance, subscriber 100 may engage in a new wireless network subscription with a second mobile network carrier owned, operated and/or administered by a second mobile network provider, and may cancel a first subscription with a first mobile network carrier owned, operated and/or administered by a first mobile network provider. Supervisory node 210 may receive the indication from, for example, a network node that tracks wireless network subscriptions for the second mobile network provider. In another circumstance, subscriber 100 may maintain separate subscriptions with two different mobile network carriers simultaneously, and may change from accessing a first wireless network associated with a first mobile network provider via UE 105, to accessing a second wireless network associated with a second mobile network provider via the same UE 105. FIG. 7 depicts supervisory node 210 receiving an indication 700 of a carrier change for subscriber 100, or non-standard APN, where the carrier change includes, in one implementation, a wireless network subscription changing from a first carrier to a second carrier.

Supervisory node 210 obtains the subscriber 100's APNs that are associated with the first carrier, or the subscriber's non-standard APNs (block 510), and obtains APNs for the second carrier that correspond to each of the subscriber's first carrier APNs or to each of the subscriber's non-standard APNs (block 520). Supervisory node 210 may, for example, maintain a current list of allowed APNs for the first carrier, or the non-standard APNs, for the subscriber 100 in local memory. Alternatively, or additionally, a current list of allowed APNs (e.g., non-standard APNs) for the subscriber 100 may be stored in HSS 125. As yet another alternative, supervisory node 210 may retrieve the current contents of device APN table 110 stored at the subscriber 100's UE 105, where such contents may include the APNs for the first wireless carrier network, or the non-standard APNs. In the case of the current list of allowed APNs being stored in HSS 125, supervisory node 210 may retrieve the current list of allowed APNs for the subscriber 100 from HSS 125. The APNs for the second carrier may be stored by, for example, a subscription management node (not shown in FIG. 2B or 7) that is associated with the 2nd wireless network carrier. FIG. 7 depicts supervisory node 210 obtaining 705 the subscriber 100's APNs associated with the first carrier, or the UE 105's non-standard APNs, and obtaining 710 the APNs for the second carrier that correspond to each of the subscriber 100's first carrier APNs, or each of the UE 105's non-standard APNs.

Supervisory node 210 designates each of the APNs for the second carrier as an "alias APN" (block 530). This designation indicates that each APN with the second carrier is an "alias" of the corresponding non-standard APN or APN with the first carrier, such that when UE 105 retrieves the non-standard APN or APN for the first carrier from the device APN table 110, a translation of the APN from the device APN table 110 to the second carrier may be achieved, by MME 135, based on the "alias" APN. FIG. 7 depicts supervisory node 210 designating 715 each of the APNs for the second carrier as an "alias APN."

Figure 6:
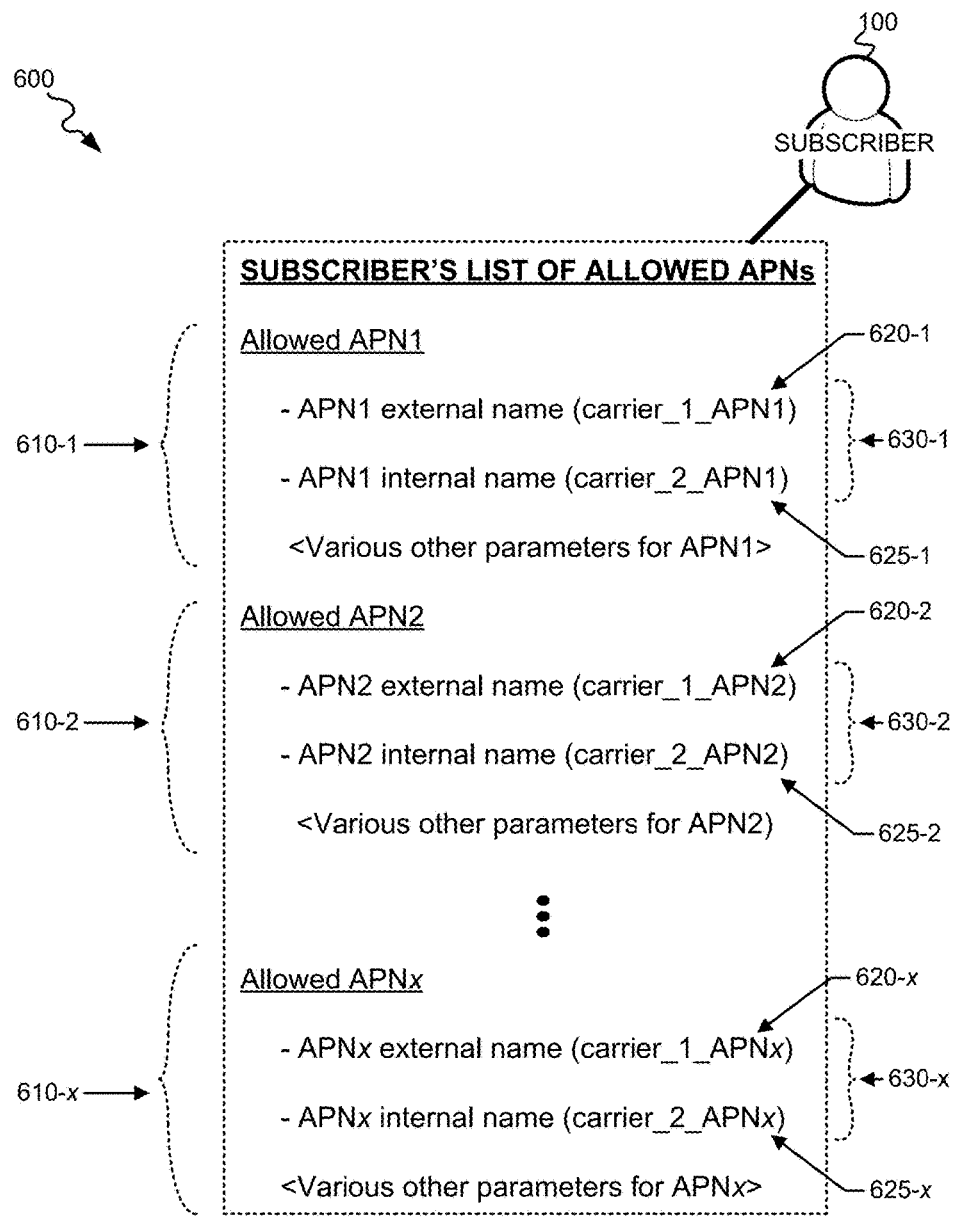
FIG. 6 is a diagram that depicts an exemplary list containing a set of APNs, including alias APNs, allowed to be accessed by a wireless network service subscriber associated with the list.

Supervisory node 210 inserts each of the subscriber's APNs for the 1st carrier, or each of the subscriber's non-standard APNs, into the subscriber's list of allowed APNs in association with a corresponding alias APN (block 540). FIG. 6 shows an exemplary list 600 containing a set of the APNs allowed to be accessed by the subscriber 100 associated with the list 600. As shown, list 600 includes multiple "allowed APNs" 610-1 through 610-x associated with a particular subscriber 100. As further shown in FIG. 6, the APN for the 1st carrier, or a non-standard APN (not shown) is inserted, and the corresponding APN for the 2nd carrier is inserted, into an "alias APN" data structure 630 that provides a mapping between the APN for the 1st carrier (or non-standard APN) to the APN for the 2nd carrier. In the exemplary "alias" APN data structures 630-1 through 630-x, shown in FIG. 6, an alias mapping descriptor 620, entitled "external name" is associated with the APN for the first carrier, or non-standard APN, inserted into "alias APN" data structure 630. The "external name" descriptor identifies the associated APN as an external APN name that the UE 105 will request, where the external APN name is an APN name that is valid in a first wireless carrier network 205-1, or is a non-standard APN name. Another alias mapping descriptor 625, entitled "internal name," is associated with the APN for the second carrier inserted into "alias APN" data structure 630. The "internal name" descriptor identifies the associated APN as an internal APN name that the second wireless carrier network 205-2 may use for internal signaling. "Alias APN" data structure 630, thus, maps an APN that is non-standard or valid in a first wireless carrier network 205-1 (but invalid in a second wireless carrier network 205-2) to a corresponding APN that is valid in the second wireless carrier network 205-2 such that a mobility management node (e.g., MME 235) may use the "alias APN" structure 630 to translate an non-standard APN, or the APN in the first wireless carrier network 205-1, to an APN in the second wireless carrier network 205-2. FIG. 7 depicts supervisory node 210 inserting 720 each of the subscriber's APNs for the first carrier, or the subscriber's non-standard APNs, into the subscriber 100's list of allowed APNs in association with a corresponding alias APN.

Supervisory node 210 inserts the subscriber's list of allowed APNs into the subscriber profile for the subscriber (block 550), and stores the new subscriber profile in HSS 125 as a new/updated subscriber profile (block 560). The existing subscriber profile includes a portion set-aside for the subscriber's list of allowed APNs, and supervisory node 210 replaces the existing list of allowed APNs with the modified list of APNs created in block 540. FIG. 7 depicts supervisory node 210 inserting 725 the subscriber 100's list of allowed APNs into the subscriber profile for the subscriber 100, and storing 730 the new/updated subscriber profile in HSS 125. The subscriber profile, stored in HSS 125, may be subsequently retrieved by, for example, the mobility management node (e.g., MME 135) for retrieving the modified list of allowed APNs that includes the set of alias APNs.

Figure 8:
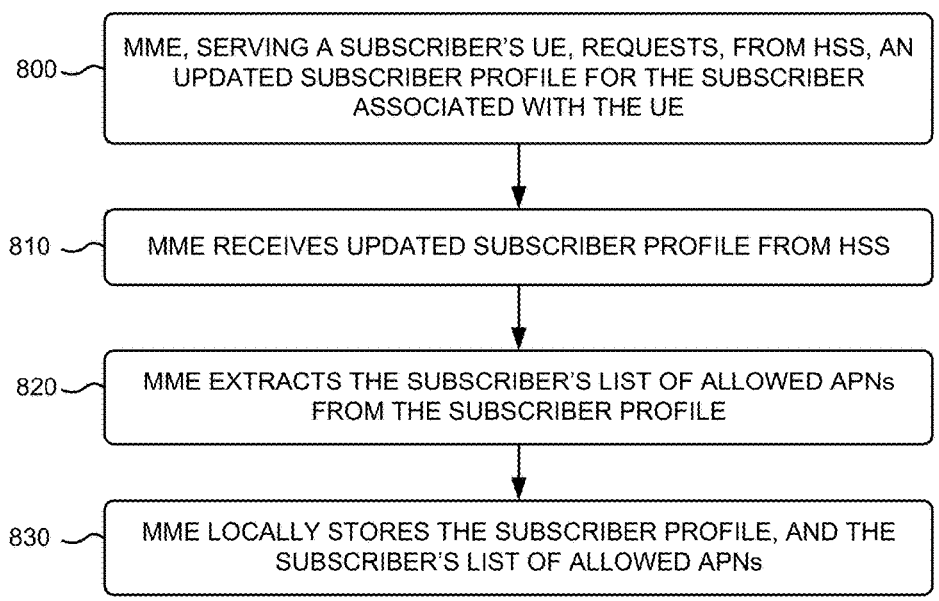
FIG. 8 is a flow diagram that illustrates an exemplary process for a mobility management node to obtain an updated subscriber profile, of a subscriber, which includes a subscriber's list of allowed APNs with alias APNs, for use at the mobility management node in handling signaling from the wireless device of the subscriber.

FIG. 8 is a flow diagram that illustrates an exemplary process for a mobility management node (e.g., MME 235) to obtain an updated subscriber profile of a subscriber 100, which includes a subscriber's list of allowed APNs with alias APNs, for use at the mobility management node in handling signaling from the UE 105 of the subscriber 100. The exemplary process of FIG. 8 may be implemented by, for example, MME 235. The exemplary process of FIG. 8 is described below with reference to the exemplary operation/messaging diagram of FIG. 9.

Figure 9:
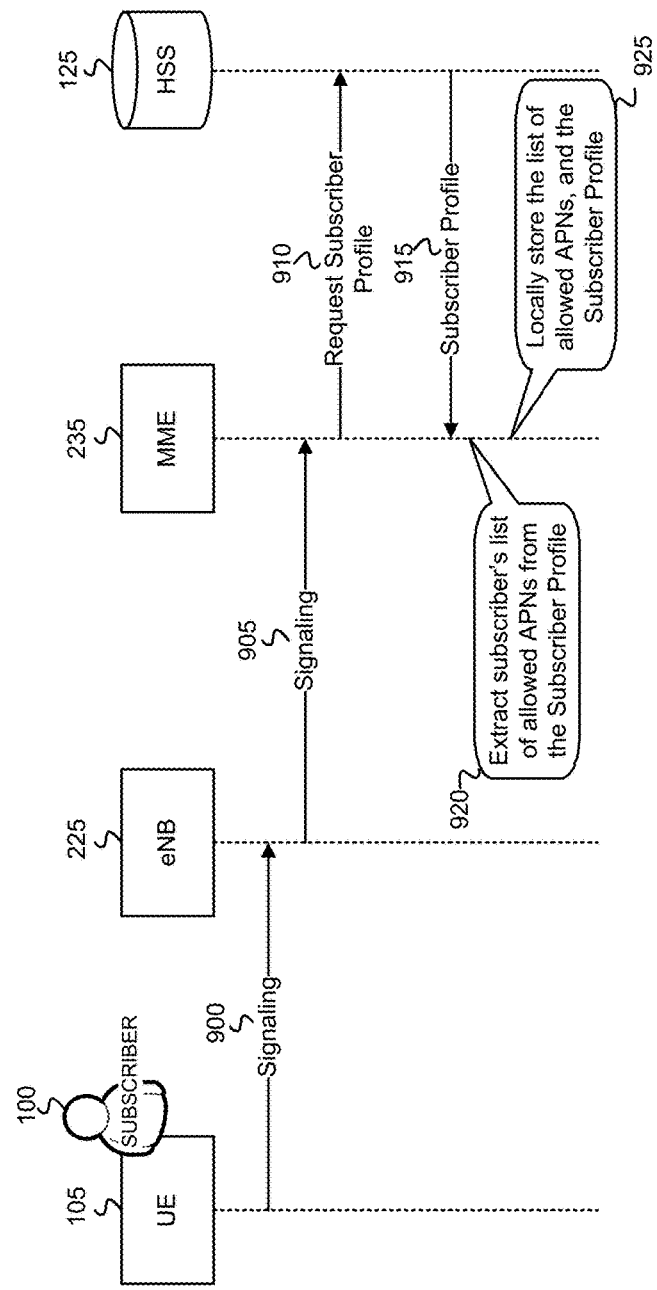
FIG. 9 is an exemplary operations/messaging diagram associated with the exemplary process of FIG. 8.

MME 235, serving a subscriber 100's UE 105, requests, from HSS 125, an updated subscriber profile for the subscriber 100 associated with the UE 105 (block 800), and MME 235 receives the updated subscriber profile from HSS 125 based on the request (block 810). As depicted in FIG. 9, MME 235 may initiate the subscriber profile request based on, for example, receiving signaling 905 from a base station (e.g., eNB 225) that received signaling from a UE 105 of subscriber 100. FIG. 9 further depicts MME 235 sending a request 910 for the subscriber 100's subscriber profile to HSS 125, and receiving a return message 915 containing the requested subscriber profile of subscriber 100.

MME 235 extracts the subscriber's list of allowed APNs from the subscriber profile (block 820), and locally stores the subscriber profile, and the subscriber 100's list of allowed APNs (block 830). The extracted list of allowed APNs includes the alias APNs, as inserted within the list of allowed APNs in block 540 of FIG. 5. FIG. 9 depicts MME 235 extracting 920 the subscriber 100's list of allowed APNs from the received subscriber profile, and locally storing 925 the list of allowed APNs and the subscriber profile.

The exemplary process of FIG. 8 may, in one implementation, be repeated at MME 235 each time the subscriber 100's UE 105 sends a service request, or other signaling, to wireless network 205. In other implementations, the exemplary process of FIG. 5 may be repeated at periodic intervals once the subscriber 100's UE 105 has connected to wireless network 205.

Figure 10:
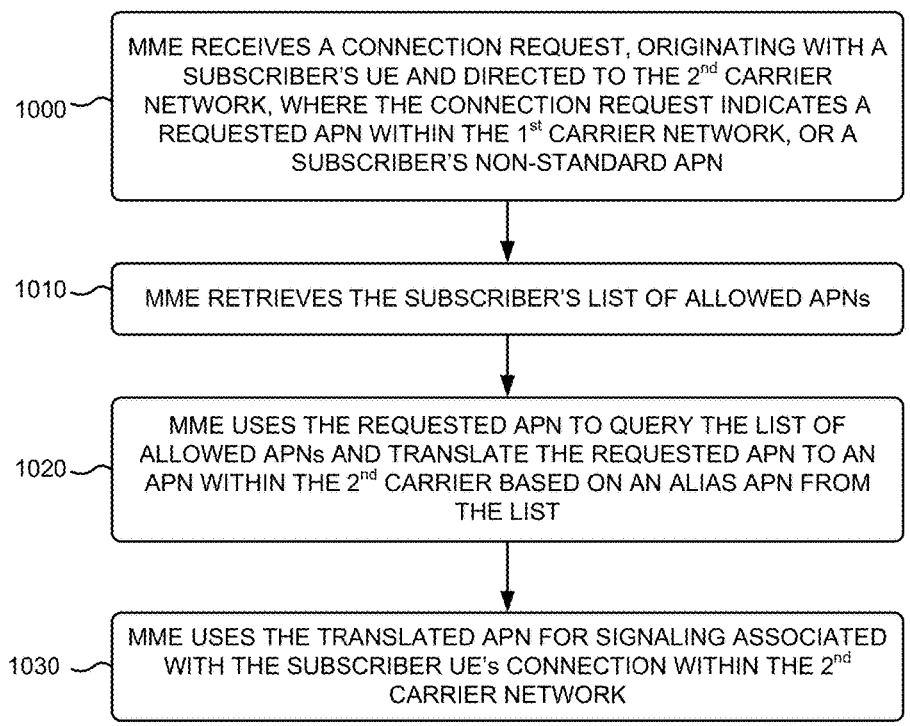
FIG. 10 is a flow diagram that illustrates an exemplary process for translating, based on alias APNs, an APN in a first wireless carrier network, or a non-standard APN that is invalid in a second wireless carrier network, to an APN in the second wireless carrier network for establishing a connection via the second wireless carrier network.

FIG. 10 is a flow diagram that illustrates an exemplary process for translating, based on alias APNs, a non-standard APN or an APN in a first wireless carrier network to an APN in a second wireless carrier network for establishing a connection via the second wireless carrier network. The exemplary process of FIG. 10 may be implemented by MME 235, in conjunction with a base station (e.g., eNB 225). The exemplary process of FIG. 10 is described below with reference to the exemplary operation/messaging diagram of FIG. 11. The exemplary process of FIG. 10 may be implemented at an MME 235 when a connection request is received from a subscriber 100's UE 105 requesting a connection, sent to a base station in a second wireless carrier network 205-2, with the request including a subscriber 100's non-standard APN from UE 105's device APN table 110 or an APN in a 1st wireless carrier network 205-1. In some implementations, the connection request may occur prior to a process which updates the APNs stored in the UE 105's device APN table 110 to reflect, for example, the subscriber 100's change from a first wireless carrier network to a second wireless carrier network.

MME 235 receives a connection request, originating with a subscriber 100's UE 105 and directed to the second carrier network 205-2, where the connection request indicates a requested APN ($APN_{1st\ Carrier}$) within the 1st carrier network 205-1, or a non-standard APN from UE 105's device APN table 110 (block 1000). When changing network access from first wireless carrier network 205-1 to second wireless carrier network 205-2, UE 105's device APN table 100 may include a set of APNs corresponding to the first wireless carrier network 205-1. Therefore, a request for a particular network connection with an APN retrieved from device APN table 100 will incorrectly identify an APN in the first wireless carrier network 205-1 ($APN_{1st\ Carrier}$) even though the connection request is being submitted to a second wireless carrier network 205-2. FIG. 11 depicts UE 105 sending a connection request 1100, which includes an APN of the first wireless carrier network 205-1 ($APN_{1st\ Carrier}$) or a non-standard APN ($APN_{non-standard}$), to eNB 225 within the second wireless carrier network 205-2. eNB 225, upon receipt of connection request 1100, forwards the connection request 1105 on to the MME 235 that is serving eNB 225 or UE 105.

MME 235 retrieves the subscriber's list of allowed APNs (block 1010), and uses the requested APN to query the list of allowed APNs and translate the requested APN to an APN within the second carrier 205-2 based on an alias APN from the list (block 1020). The subscriber's list of allowed APNs may be retrieved from local memory at MME 235, or may be retrieved from HSS 125 if the list is not currently cached in the local memory. Referring to the exemplary list 600 of allowed APNs of FIG. 6, MME 235 locates the alias APN data structure 630 that includes an "external name" descriptor 620 that equals the requested APN. Within the located alias APN data structure 630, MME 235 locates the APN associated with the "internal name" alias mapping descriptor 625, and translates the requested APN into the APN associated with the "internal name" alias mapping descriptor 625. The alias APN data structure 630, thus, permits MME 235 to translate the requested APN by mapping it from a non-standard APN, or an APN in the first wireless carrier network 205-1, to an APN in a second wireless carrier network 205-2. The connection request from UE 105 may additionally include a subscriber ID for the subscriber 100 such that MME 135 may use the subscriber ID to retrieve the subscriber 100's list of allowed APNs. FIG. 11 depicts MME 235 retrieving 1110 the subscriber's list of allowed APNs, and using 1115 the $APN_{1st\ Carrier}$ to query the list of allowed APNs and translate the APN to an APN (APN2nd Carrier) within the second wireless carrier network using an alias APN from the list.

MME 235) uses the translated APN ($APN_{2nd\ Carrier}$) for signaling associated with the subscriber 100's UE 105's connection with the 2nd carrier network 205-2 (block 1030). Any signaling associated with a connection of the subscriber 100's UE 105's via the second wireless network carrier 205-2 to the destination network (or other destination) will contain the translated APN ($APN_{2nd\ Carrier}$). FIG. 11 depicts MME 235 using 1120 the translated $APN_{2nd\ Carrier}$ for signaling 1125 associated with subscriber 100's UE connection with the second wireless carrier network. Signaling from UE 105 to MME 235 uses the $APN_{1st\ Carrier}$ within the first wireless carrier network 205-1, or the non-standard APN ($APN_{non-standard}$), whereas signaling from MME 135, associated with service to UE 105, uses $APN_{2nd\ Carrier}$ for signaling between MME 235 and other nodes in wireless network 205-2 (e.g., SGW 230, PGWs 240)

The exemplary process of FIG. 10 may be repeated at MME 235 for each connection request, directed to a second wireless carrier network, where the connection request includes a requested APN within a first wireless carrier network, or a non-standard APN.

In circumstances where the subscriber has migrated from a first wireless carrier network to a second wireless carrier network and subsequent to execution of the exemplary process of FIG. 10, the device APN table 110 may be updated such that the APNs within the table are directed to APNs in the second wireless carrier network, instead of to APNs directed to the previous first wireless carrier network. Therefore, for future connection requests from UE 105 to the second wireless carrier network, UE 105 can retrieve an APN for the second wireless carrier network, from the updated device APN table 110, and include it within the connection request to the second wireless carrier network. The device APN table 110 update process may, in some implementations, be performed by an Open Mobile Alliance (OMA) Device Management (DM) node and/or a Lightweight (LW) Machine-to-Machine management node. In other circumstances, such as when the subscriber maintains subscriptions with two different wireless carriers simultaneously, or when the subscriber 100's UE 105 does not deploy a carrier-specific device management client, or when the subscriber 100's UE 105 uses non-standard APNs (e.g., with MPN service, etc.), the device APN table 110 may not be updated, and the alias APNs within the list of allowed APNs for the subscriber may continue to be used for translating the APNs retrieved from the device's APN table 110 to corresponding APNs that are valid in the wireless carrier network to which the device is connecting.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 8, and 10, and operation/message flows with respect to FIGS. 7, 9, and 11, the order of the blocks and/or operation/message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a mobility management node in a first wireless carrier network, a connection request that includes a first Access Point Name (APN) that is invalid in the first wireless carrier network, wherein the connection request originated from a wireless device;
obtaining, by the mobility management node, a set of first APNs that map the first APN, and other APNs, that are invalid in the first wireless carrier network, to APNs that are valid in the first wireless carrier network;
translating, by the mobility management node using the set of first APNs, the first APN to a second APN corresponding to the first wireless carrier network; and
using, by the mobility management node, the second APN in signaling associated with a connection, between the wireless device and the first wireless carrier network.

2. The method of claim 1, wherein the first APN is valid within a second wireless carrier network that is different than the first wireless carrier network.

3. The method of claim 2, wherein the second wireless carrier network is owned, operated or administered by a second wireless network provider and wherein the first wireless carrier network is owned, operated or administered by a first wireless network provider that is different than the second wireless network provider.

4. The method of claim 2, wherein the first APN is associated with a second gateway between the second wireless carrier network and another network, and wherein the second APN is associated with a first gateway between the first wireless carrier network and the other network.

5. The method of claim 4, wherein the first wireless carrier network comprises a Public Land Mobile Network (PLMN) or satellite network, and the other network comprises an Internet.

6. The method of claim 4, wherein the second APN is for use in signaling associated with the connection between the wireless device and the first wireless carrier network, and the other network.

7. The method of claim 1, wherein obtaining the set of first APNs comprises:
retrieving, by the mobility management node, a subscriber profile of a subscriber associated with the wireless device; and
obtaining the set of first APNs from the retrieved subscriber profile.

8. The method of claim 7, wherein obtaining the set of first APNs from the retrieved subscriber profile comprises:
retrieving, from the subscriber profile, a list of APNs that are allowed for the subscriber, wherein the list of APNs includes the set of first APNs.

9. A network device, comprising:
a communication interface configured to receive, via a first wireless carrier network, a connection request that includes a first Access Point Name (APN) that is invalid in the first wireless carrier network, wherein the connection request originates from a wireless device; and
a processor configured to:
obtain a set of first APNs that map the first APN, and other APNs, that are invalid in the first wireless carrier network to APNs that are valid in the first wireless carrier network;
translate, using the set of first APNs, the first APN to a second APN corresponding to the first wireless carrier network; and
using the second APN in signaling associated with a connection, between the wireless device and the first wireless carrier network.

10. The network device of claim 9, wherein the first APN is valid within a second wireless carrier network that is different than the first wireless carrier network.

11. The network device of claim 10, wherein the first APN is associated with a second gateway between the second wireless carrier network and another network, and wherein the second APN is associated with a first gateway between the first wireless carrier network, and the other network.

12. The network device of claim 10, wherein the first wireless carrier network comprises a Public Land Mobile Network (PLMN) or satellite network, and the other network comprises an Internet.

13. The network device of claim 11, wherein the second APN is for use in signaling associated with the connection between the wireless device and the first wireless carrier network, and the other network.

14. The network device of claim 9, wherein, when obtaining the set of first APNs, the processor is configured to:
retrieve a subscriber profile of a subscriber associated with the wireless device; and
obtain the set of first APNs from the retrieved subscriber profile.

15. The network device of claim 14, wherein, when obtaining the set of first APNs from the retrieved subscriber profile, the processor is further configured to:
retrieve, from the subscriber profile, a list of APNs that are allowed for the subscriber, wherein the list of APNs includes the set of first APNs.

16. A non-transitory storage medium storing instructions executable by a network device, wherein the instructions comprise instructions to cause the network device to:
receive, via a first wireless carrier network, a connection request that includes a first Access Point Name (APN) that is invalid in the first wireless carrier network, wherein the connection request originated from a wireless device;
obtain a set of first APNs that map the first APN, and other APNs, that are invalid in the first wireless carrier network to APNs that are valid in the first wireless carrier network;
translate, using the set of first APNs, the first APN to a second APN corresponding to the first wireless carrier network; and
use the second APN in signaling associated with a connection, between the wireless device and the first wireless carrier network.

17. The non-transitory storage medium of claim 16, wherein the first APN is valid within a second wireless carrier network that is different than the first wireless carrier network.

18. The non-transitory storage medium of claim 17, wherein the first APN is associated with a second gateway between the second wireless carrier network and another network, and wherein the second APN is associated with a first gateway between the first wireless carrier network, and the other network.

19. The non-transitory storage medium of claim 16, wherein the instructions to obtain the set of first APNs further comprise instructions to cause the network device to:
retrieve a subscriber profile of a subscriber associated with the wireless device; and
obtain the set of first APNs from the retrieved subscriber profile.

20. The non-transitory storage medium of claim 19, wherein the instructions to obtain the set of first APNs from the retrieved subscriber profile further comprise instructions to cause the network device to:
retrieve, from the subscriber profile, a list of APNs that are allowed for the subscriber, wherein the list of APNs includes the set of alias APNs.

* * * * *